US008635107B2

(12) United States Patent
Chang et al.

(10) Patent No.: US 8,635,107 B2
(45) Date of Patent: Jan. 21, 2014

(54) AUTOMATIC EXPANSION OF AN ADVERTISEMENT OFFER INVENTORY (75) Inventors: Walter Chang, San Jose, CA (US); Geoff Baum, Palo Alto, CA (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

(21) Appl. No.: 13/153,328

(22) Filed: Jun. 3, 2011

(65) Prior Publication Data
US 2013/0132365 A1    May 23, 2013

(51) Int. Cl.
G06Q 30/00    (2012.01)
G06F 17/30    (2006.01)

(52) U.S. Cl.
USPC ..... 705/14.66; 705/14.1; 705/14.4; 705/26.1; 707/707; 707/709; 707/711; 707/732; 707/739

(58) Field of Classification Search
None
See application file for complete search history.

(56) References Cited

U.S. PATENT DOCUMENTS

| | | | |
|---|---|---|---|
| 5,636,346 A | 6/1997 | Saxe | |
| 5,892,900 A | 4/1999 | Ginter et al. | |
| 6,061,658 A | 5/2000 | Chou et al. | |
| 6,317,872 B1 | 11/2001 | Gee et al. | |
| 6,519,571 B1 | 2/2003 | Guheen et al. | |
| 7,072,858 B1 | 7/2006 | Litzow et al. | |
| 7,174,381 B2 | 2/2007 | Gulko et al. | |
| 7,224,185 B2 | 5/2007 | Campbell et al. | |
| 7,599,851 B2 | 10/2009 | Frengut et al. | |
| 7,992,171 B2 | 8/2011 | Amidon et al. | |
| 2001/0013009 A1 | 8/2001 | Greening et al. | |
| 2001/0032128 A1 | 10/2001 | Kepecs | |
| 2003/0023482 A1 | 1/2003 | Messner et al. | |
| 2005/0114366 A1 | 5/2005 | Mathai et al. | |
| 2006/0095327 A1* | 5/2006 | Vaughn et al. | 705/14 |
| 2006/0212355 A1 | 9/2006 | Teague | |
| 2007/0230706 A1 | 10/2007 | Youn | |
| 2008/0090513 A1 | 4/2008 | Collins et al. | |
| 2008/0163071 A1 | 7/2008 | Abbott et al. | |
| 2009/0164441 A1* | 6/2009 | Cheyer | 707/4 |
| 2009/0271263 A1* | 10/2009 | Regmi et al. | 705/14.17 |
| 2010/0042471 A1 | 2/2010 | Chang et al. | |
| 2010/0094878 A1 | 4/2010 | Soroca et al. | |
| 2010/0106568 A1 | 4/2010 | Grimes | |
| 2010/0138867 A1 | 6/2010 | Wong et al. | |
| 2010/0211464 A1* | 8/2010 | Zhu et al. | 705/14.53 |
| 2010/0268600 A1* | 10/2010 | Banko et al. | 705/14.52 |
| 2012/0226559 A1 | 9/2012 | Baum et al. | |
| 2012/0226562 A1 | 9/2012 | Baum et al. | |
| 2012/0226697 A1 | 9/2012 | Chang et al. | |
| 2012/0226700 A1 | 9/2012 | Chang et al. | |
| 2013/0132220 A1 | 5/2013 | Baum | |

OTHER PUBLICATIONS

"Final Office Action", U.S. Appl. No. 13/039,177, (Dec. 12, 2012), 20 pages.

(Continued)

Primary Examiner — Sangwoo Ahn
(74) Attorney, Agent, or Firm — Wolfe-SBMC (57) ABSTRACT An extensible offer inventory database of offers in a domain is established. Further, an offer ontology is generated based on the extensible offer inventory database. The offer ontology provides an extensible vocabulary that correlates to categories in the offer inventory database. In addition, offers are automatically located. The offers are also semantically analyzed to generate semantic analysis data. Further, user data is obtained. In addition, an optimal offer match is automatically determined based upon the semantic analysis data and the user data.

20 Claims, 9 Drawing Sheets (56) References Cited

OTHER PUBLICATIONS

"Final Office Action", U.S. Appl. No. 13/039,207, (Dec. 31, 2012), 13 pages.
"Final Office Action", U.S. Appl. No. 13/039,242, (Jan. 2, 2013), 12 pages.
"Final Office Action", U.S. Appl. No. 13/039,257, (Jan. 3, 2013), 12 pages.
"Lawson M3 Manufacturing Operations: Attribute Control", Lawson Software, Inc. 5636346,(2008), 12 pages.
"Non-Final Office Action", U.S. Appl. No. 12/862,386, (Oct. 9, 2012), 8 pages.
"Non-Final Office Action", U.S. Appl. No. 13/039,177, (Sep. 10, 2012), 19 pages.
"Non-Final Office Action", U.S. Appl. No. 13/039,207, (Sep. 13, 2012), 16 pages.
"Non-Final Office Action", U.S. Appl. No. 13/039,242, (Jun. 8, 2012), 10 pages.
"Non-Final Office Action", U.S. Appl. No. 13/039,257, (Jul. 18, 2012), 10 pages.
"SQL Tutorials—Lesson 1: SQL Startup", Retrieved from: <http://www.functionx.com/sql/Lesson01.htm> on Aug. 20, 2012,(2004-2007), 4 pages.
Dattero, Ronald et al., "Programming Languages and Gender", *Communications of the ACM*, vol. 47, No. 1, (Jan. 2004), pp. 99-102.
De Haan, Lex et al., "Nulls: Nothing to Worry About", Retrieved from: <http://www.oracle.com/technetwork/issue-archive/2005/05-jul/o45sql-097727.html> on Aug. 20, 2012,(Jul. 2005), 1 page.
Lam, Wang "The Behavior of NULLs in SQL", Retrieved from: <http://www-cs-students.stanford.edu/˜wlam/compsci/sqlnulls> on Dec. 26, 2012, (Aug. 5, 2004), 4 pages.
Preiss, Bruno R., "Data Structures and Algorithms with Object-Oriented Design Patterns in Java", Retrieved from: <http://www.brpreiss.com/books/opus5/html/page264.html> on Aug. 20, 2012,(1998), 2 pages.
"Final Office Action", U.S. Appl. No. 12/862,386, Mar. 26, 2013, 11 pages.
"Final Office Action", U.S. Appl. No. 12/862,386, Apr. 9, 2013, 12 pages.
"Non-Final Office Action", U.S. Appl. No. 13/039,266, Mar. 12, 2013, 12 pages.
"Final Office Action", U.S. Appl. No. 12/862,386, (Jun. 26, 2013),13 pages.
"Final Office Action", U.S. Appl. No. 13/039,266, (Aug. 5, 2013),14 pages.
"Non-Final Office Action", U.S. Appl. No. 13/039,207, (Aug. 15, 2013), 20 pages.
"Notice of Allowance", U.S. Appl. No. 13/039,177, (Sep. 4, 2013), 7 pages.
"Notice of Allowance", U.S. Appl. No. 13/039,257, (Sep. 12, 2013), 14 pages.
Wen-Xiu, et al., "Market basket analysis based on text segmentation and association rule mining", *First International Conference on Networking and Distributed Computing*, (Oct. 2010), pp. 309-313.

\* cited by examiner

AUTOMATIC EXPANSION OF AN ADVERTISEMENT OFFER INVENTORY

BACKGROUND

1. Field

This disclosure generally relates to advertising. More particularly, the disclosure relates to automatically expanding an advertisement offer inventory.

2. General Background

Many current websites leverage the recorded behaviors of large numbers of site users in determining content, products, and services to recommend for different segments of users. As an example, a recommendation system may utilize techniques such as the classification of consumers into micro-segments to assist in the matching of product offers created by marketers. However, marketers are typically reluctant to spend the effort to define and target ads when the number of potential consumers is relatively small. Further, consumers are reluctant to participate or visit offer sites when they see that there are relatively few offers of interest. This situation thus creates a "chicken and egg" problem preventing a successful e-business from developing.

SUMMARY

In one aspect of the disclosure, a computer program product is provided. The computer program product includes a computer usable medium having a computer readable program. The computer readable program when executed on a computer causes the computer to establish an extensible offer inventory database of offers in a domain. Further, the computer readable program when executed on the computer causes the computer to generate an offer ontology based on the extensible offer inventory database. The offer ontology provides an extensible vocabulary that correlates offers to categories in the offer inventory database. In addition, the computer readable program when executed on the computer causes the computer to automatically locate the offers. The computer readable program when executed on the computer causes the computer to semantically analyze text of the offers to generate semantic analysis data. Further, the computer readable program when executed on the computer causes the computer to obtain user data. In addition, the computer readable program when executed on the computer causes the computer to automatically determine an optimal offer match based upon the semantic analysis data and the user data.

In another aspect of the disclosure, a process is provided. The process establishes an extensible offer inventory database of offers in a domain. Further, the process generates an offer ontology based on the extensible offer inventory database. The offer ontology provides an extensible vocabulary that correlates to categories in the offer inventory database. In addition, the process automatically locates the offers. The process also semantically analyzes text of the offers to generate semantic analysis data. Further, the process obtains user data. In addition, the process automatically determines an optimal offer match based upon the semantic analysis data and the user data.

In yet another aspect of the disclosure, a system is provided. The system includes an extensible offer inventory database of offers in a domain. Further, the system includes an offer ontology engine that generates an offer ontology based on the extensible offer inventory database. The offer ontology provides an extensible vocabulary that correlates to categories in the offer inventory database. Further, the system includes an advertisement location module that automatically locates the offers. In addition, the system includes a semantic analysis module that semantically analyzes text of the offers to generate semantic analysis data. The system includes a reception module that receives user data. Further, the system includes a processor that automatically determines an optimal offer match based upon the semantic analysis data and the user data.

DRAWINGS

The above-mentioned features of the present disclosure will become more apparent with reference to the following description taken in conjunction with the accompanying drawings wherein like reference numerals denote like elements and in which.

DETAILED DESCRIPTION

An automatic offer inventory expansion system systematically captures a wide range of diverse product/service offers. Further, the product/service offers may be automatically tagged and classified so that the product/service offers may be efficiently matched to consumers by an online offer recommendation system. In one embodiment, a website, e.g., a shopping portal, may provide a large inventory of product/service offers and/or content that can match interests of consumers who visit the portal. The large inventory may be built by incrementally attracting product/service marketers to advertise and list their products and services at the website by way of offer campaigns that target website users that have specific demographic information, e.g., age, gender, income, or product category interest. In another embodiment, a more scalable approach is utilized to capture diverse product/service offers and ads directly from a variety of sources in a systematic and automated way and then automatically present these offers to users visiting the website by matching against the user's implicit and explicit information. Implicit information is represented by a characteristic that may be inferred, e.g., from a behavior. Explicit information is information that the user is providing about himself or herself. When users respond by viewing the offer/ads or when a purchase conversion is made and recorded, the product marketer pays a fee or shares with the website a portion of the sales transaction revenue. In this latter approach, semantic analysis of external offers is performed in order to index and match these offers to consumers. The automatic offer inventory expansion system provides a scalable approach to growing an offer inventory by creating or acquiring a comprehensive and extensible categorization and segmentation database of offers, automatically locating, capturing semantically analyzing, and extracting offer ads and any essential related offer information, and automatically utilizing information gathered about the user combined with the semantic analysis of offer information to find the most relevant offers from its offer inventory.

The term offer website may include lead-generation websites, shopping portals, or any other website or application where a consumer interacts with a system that collects user and offer information. Further, the term user includes a consumer who purchases a product/service at the website. In addition, the term offer inventory is intended to be a collection of product, service, or content offers that may be of interest to a consumer. Each offer contains specific information such as the name of the product, a description, price information, and a method for purchasing the product. The offer inventory may utilize an offer inventory database to store and index actual offers, web links, and associated offer metadata. Further, the term semantic analysis within the context of automated offer inventory expansion is intended to mean the process of building an accurate keyword and concept model of an ad by relating terminology and concepts about an offer and performing statistical and symbolic text analysis at the levels of phrases, clauses, sentences and paragraphs to the level of the entire offer text to determine what an offer is and what the offer is about. In addition, the term ontology is intended to be a structured representation of the knowledge formed by the concepts and terminology within a domain, e.g., consumer electronics. A domain may be a product/service/content category. The ontology expresses relationships between concepts and terminology within the domain. Further, the ontology supports a controlled vocabulary for the domain and may be utilized to reason about entities within the domain. The ontology plays a role in providing a standard and extensible vocabulary of product names and categories by supporting synonym names and abbreviations. For example, an ontology may be utilized to record a name of a product, which is a type of an mp3 player, which is a type of audio equipment, etc.

The offer inventory expansion system may be utilized to create and evolve an offer ontology. As a result of the growth of online shopping, social and group buying, and shopping aggregators, online product offers are diverse and being created at an unprecedented rate. In order to create a comprehensive and extensible categorization system for captured offers, a knowledge representation structure such as an ontology may be readily employed. Managing this vast amount of offer information, whether structured or unstructured, involves mapping between disparate product sources. The disparate product sources may include different product name and category nomenclature and product relationships. A combination of manual and automatic ontology maintenance may be utilized to address the challenge of semantic integration of commerce knowledge.

Further, the offer inventory expansion system may capture offers and expand the offer inventory. Manually constructing and maintaining offer ontologies would be an extremely laborious effort. Not only must product/service/content providers and marketers agree on the category and relationships needed for the collection of offers, but they must also do so in a way that both minimizes errors and is easy to update and maintain. The offer inventory expansion system creates and/or augments these offer ontologies to automatically capture or ingest offers from partners and/or affiliates, leverage any existing metadata associated with the offer, and then analyze the text of each offer to help tag and classify the offer into the offer ontology for later use.

The process of tagging and classifying offers results in the identification and extraction of a key offer attribute. Offers can then be grouped into micro-segments which define common but selective attributes of the offer. For example, the offer product may be in the sub-category of mp3 players, which is under the parent category of audio equipment, which is under the general category of consumer electronics. The product brand may also be utilized.

The offer inventory expansion system utilizes collected consumer information to recommend offers. After being tagged and classified, offers in particular micro-segments may be efficiently matched with and delivered to users who have been grouped into respective target micro-segments. A micro-segment is a precise division of a market or population that is typically identified by marketers through advanced technology and techniques. For example, data mining, artificial intelligence, and various algorithms may be utilized. These technologies and techniques are utilized to group consumers into fine-grained segments by recognizing and predicting minute consumer spending and behavioral patterns, i.e., micro-segmentation. In other words, a micro-segment is a group of (purchase) decision makers who share similar attributes, purchase behavior, and/or level of interest in a specific set of features.

The offer inventory expansion system provides a generalized and automated method for capturing ad offers to increase the inventory of any online shopping portal and subsequent offer recommendations to portal consumers. A variety of example configurations are provided.

Figure 1:
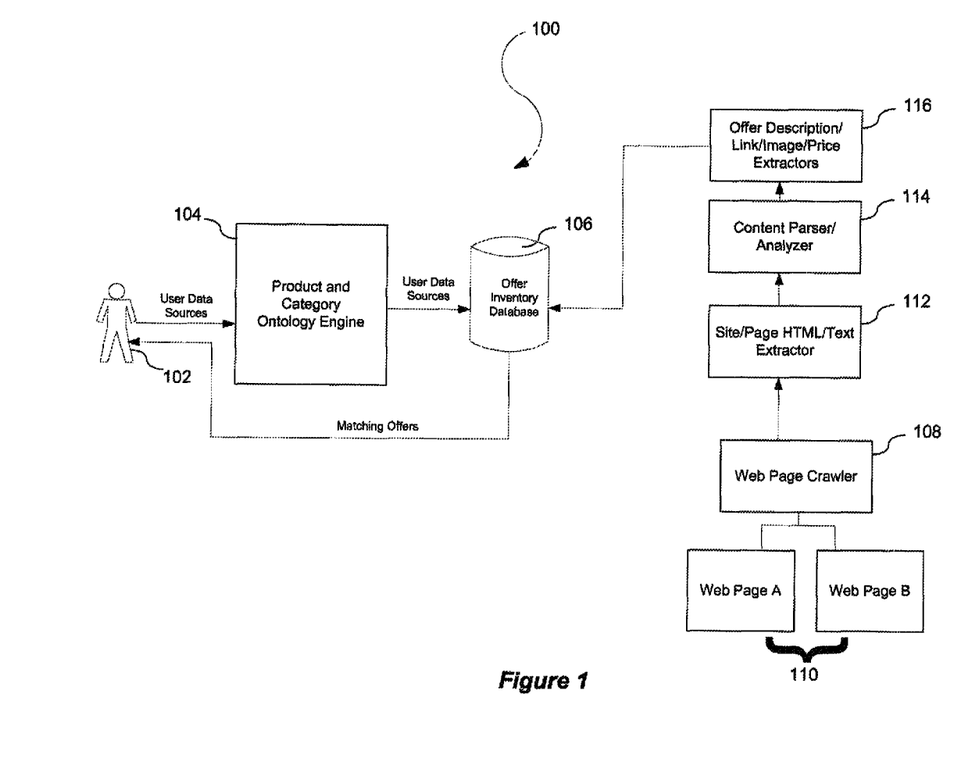
FIG. 1 illustrates an example configuration of the offer inventory expansion system crawling a plurality of websites for online offers.

FIG. 1 illustrates an example configuration 100 of the offer inventory expansion system crawling a plurality of websites for online offers. A plurality of user data sources from a user 102 may be identified. Examples of user data sources include, but are not limited to, explicitly expressed interests, purchase history, and product wishlists. Explicit data attributes such as Age, Gender, Income, and Product Purchase History are identified and collected. Implicit attributes may be inferred and utilized with any explicit attributes. Further, the user data sources may be provided to a product and category ontology engine 104. By analyzing data attributes of the user data sources, the product and category ontology engine 104 determines normalized/indexed product/offer names to query an offer inventory database 106. The normalization allows arbitrary data attributes to be utilized to search the offer inventory database 106. Further, the product and category ontology engine 104 is separated from the offer inventory database 106 to allow offers to be collected and recorded independent of any natural language processing of web page data, ontology update processing, or terminology normalization.

A web crawler 108 identifies offer webpage sources by searching through a plurality of webpages 110. Examples of offer webpage sources include online stores and retailers. Further, another example of an offer webpage source is an online catalog. Portal managers may determine which web pages will be searched based on portal consumer demographics, e.g., women in the age range of eighteen to twenty-four, and active business relationships such as a business partner being a particular store. In addition, the offer inventory expansion system crawls and analyzes a number of offer web pages that contain actual product/service/content ads. The webpage sources found by the web crawler 108 are then processed by a site/page html/text extractor 112 that extracts the html and text, content parser/analyzer 114 that parses and analyzes the text, and offer description/link/image/price extractors that extract relevant descriptive information of the product/service/content. In other words, a natural language and statistical text mining methodology analyzes the offer web pages to determine the offers, their descriptions, pricing, and other relevant information. After offer web pages are analyzed, normalized offer metadata is indexed and stored in the offer inventory database 106. User data attributes may be utilized to search the product and category ontology to find normalized terms that will be utilized to find the index terms to locate specific product offers in the offer inventory database. The product and category ontology engine 106 performs a mapping function as offers on web pages may have specific terminology, e.g., unique product and brand names that may not match up with data provided by the explicit or implicit user data attributes. Offers matched by the offer inventory database search are delivered to the user for review, discard, or conversion. Views and conversions are recorded, and the portal receives revenue credit from the offer provider/partner. All actions may be recorded including a discard action.

Figure 2:
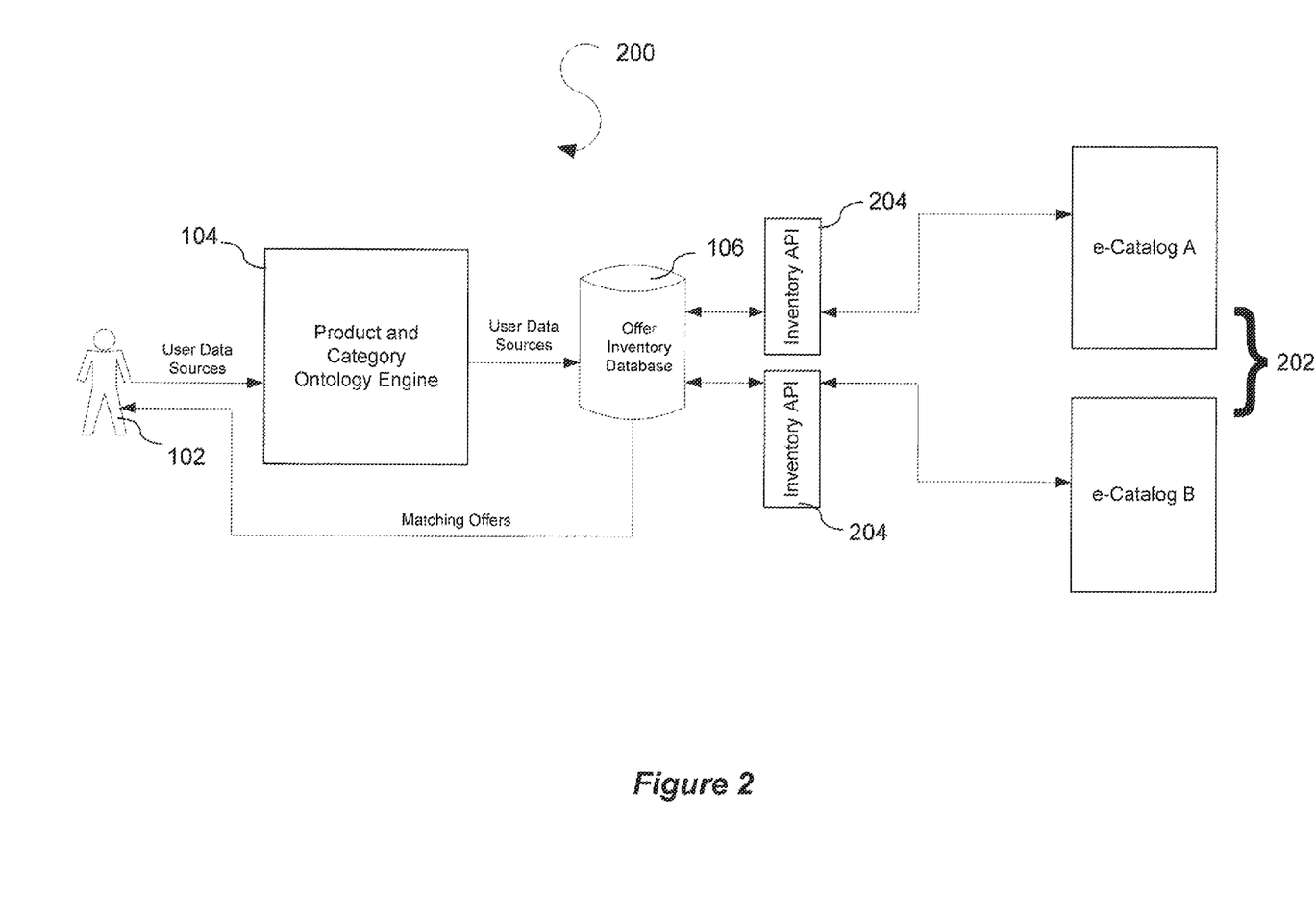
FIG. 2 illustrates an example configuration in which the offer inventory expansion system is utilized to index offers from existing catalogs of retail clients.

FIG. 2 illustrates an example configuration 200 in which the offer inventory expansion system is utilized to index offers from existing catalogs of retail clients. Explicit data attributes such as Age, Gender, Income, and Product Purchase History are identified and collected. Implicit attributes may also be inferred and utilized along with explicit attributes. A crossover may exist between implicit information and explicit information. For example, the system may infer that a user is a female and twenty-five years old based on her behavior, but may know that she lives in San Francisco based on her IP address, purchase history, and/or purchase from a previous transaction. A plurality of user data sources from a user 102 may be identified. Examples of user data sources include, but are not limited to, explicitly expressed interests, purchase history, and product wishlists. Explicit data attributes such as Age, Gender, Income, and Product Purchase History are identified and collected. Implicit attributes may be inferred and utilized with any explicit attributes. Further, the user data sources may be provided to a product and category ontology engine 104. By analyzing data attributes of the user data sources, the product and category ontology engine 104 determines normalized/indexed product/offer names to query an offer inventory database 106. The normalization allows arbitrary data attributes to be utilized to search the offer inventory database 106. Further, the product and category ontology engine 104 is separated from the offer inventory database 106 to allow offers to be collected and recorded independent of any natural language processing of web page data, ontology update processing, or terminology normalization.

Further, portal marketers determine what catalog metadata will be searched based on portal consumer demographics, e.g., mostly women in the age range of eighteen to twenty-four, and active business relationships. Product offer metadata is imported and analyzed from the identified catalog entries. For example, a plurality of e-Catalogs 202 may be searched for particular catalog entries. Identified offers and their associated metadata are stored into the offer inventory database 106. User data attributes are then utilized to search the product and category ontology to find normalized and indexed terms to help locate specific product offers in the offer inventory database. As catalogs have particular terminology, e.g., unique product and brand names, that may not match up with data provided by the explicit or implicit user data attributes, the product and category ontology helps provide a mapping between product brands and names in the catalog and product brands and names mentioned in the user data. In other words, the product and category ontology engine provides a mapping ontology that is utilized to search for matching offers from an online catalog.

An inventory Application Programming Interface ("API") 204 provides an interface between each of the e-Catalogs 202 and the inventory database 206. Accordingly, the offers from the e-Catalogs 202 may be seamlessly transferred to the offer inventory database 106.

The product and category ontology engine 106 performs a matching as offers on web pages may have specific terminology, e.g., unique product and brand names that may not match up with data provided by the explicit or implicit user data attributes. Offers matched by the offer inventory database search are delivered to the user for review, discard, or conversion. Review may in some instances lead to conversion. Views and conversions are recorded, and the portal receives revenue credit from the offer provider/partner. Offers that match the user data attributes are then provided to the user.

Figure 3:
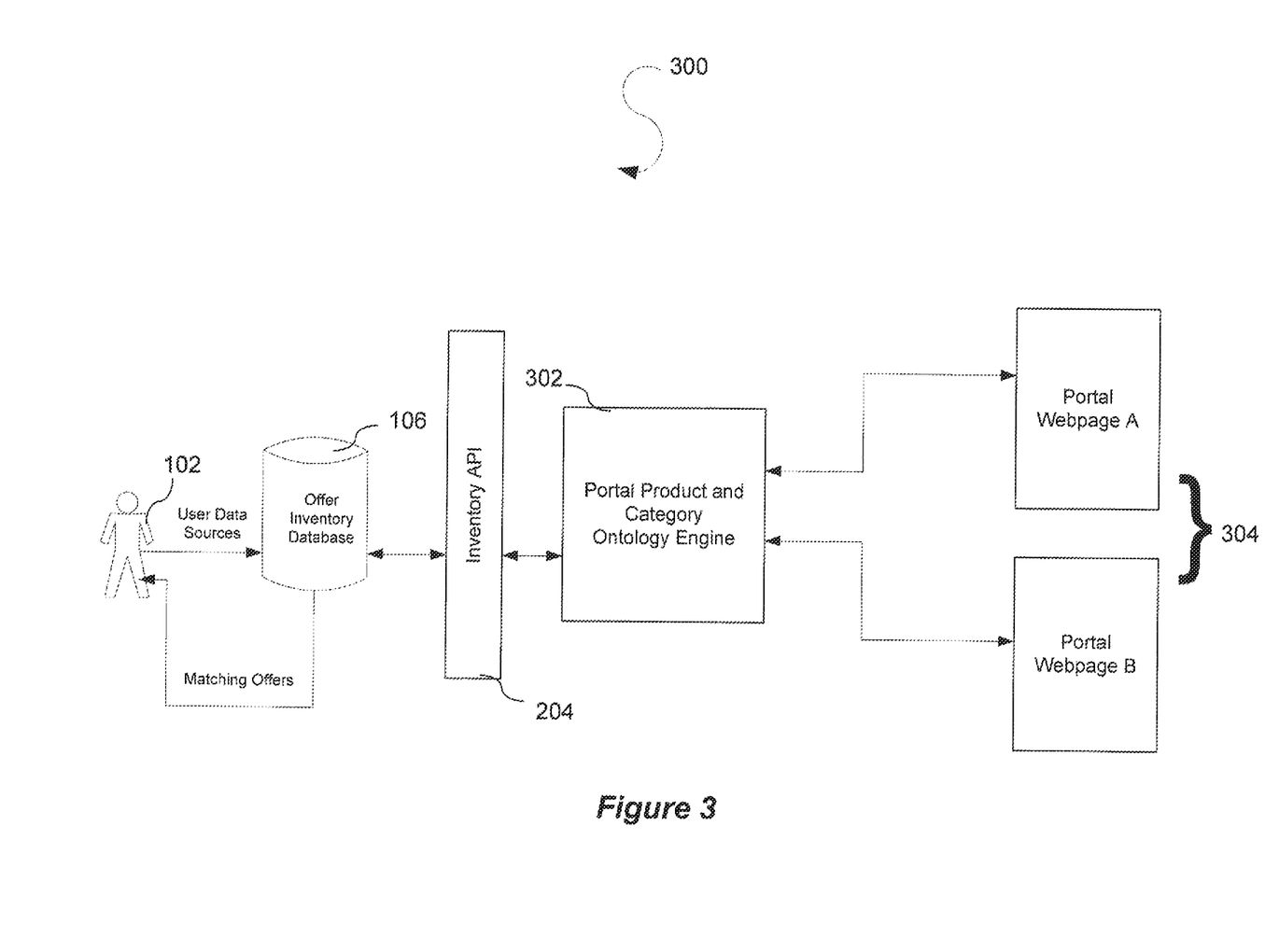
FIG. 3 illustrates an example configuration in which the offer inventory expansion system is utilized to index partner offers.

FIG. 3 illustrates an example configuration 300 in which the offer inventory expansion system is utilized to index partner offers. An example of a partner may be a shopping website such as a portal. A plurality of user data sources from a user 102 may be identified. Examples of user data sources include, but are not limited to, explicit expressed interests, purchase history, and product wishlists. Explicit data attributes such as Age, Gender, Income, and Product Purchase History are identified and collected. Implicit attributes may be inferred and utilized with any explicit attributes. Further, portal marketers determine which offer inventory metadata will be searched based on portal consumer demographics, e.g., mostly women in the age range of eighteen to twenty-four, and active business relationships.

A portal product and category ontology engine 302 is utilized by the portal. A portal is described herein as an example as different types of websites may also utilize a product and category ontology engine. The portal product and category ontology engine 302 may be utilized to search for offers from the offer inventory of various portal webpages 304 of the portal. Various offers may then be extracted. Those extracted offers may then be provided by the portal product and category ontology engine 302 through the inventory API 204 to the offer inventory database 106.

User data attributes are utilized to search the product and category ontology to find normalized and indexed terms to help locate specific product offers in the offer inventory database 106. As the portal may have particular terminology, e.g., unique product and brand names, that may not match up with data provided by the explicit or implicit user data attributes, the product and category ontology 302 helps provide such a mapping between terms. In other words, the product and category ontology engine 302 provides a mapping ontology that is utilized to search for matching offers from the portal webpages 304. Utilizing the user attributes, the product and category ontology 302 may be utilized to get the normalized/indexed product offer names to query the offer inventory database 106. The user may then receive those matching offers. In one embodiment, the query partner offer inventory may be continuously queried to obtain the latest offers for matching.

In an alternative embodiment, search engine offers may be directly imported from third parties. In other words, the example configuration 300 illustrated in FIG. 3 may be utilized to capture offers from third-party ad campaigns. The ad campaigns may provide less metadata as a result of a small amount of descriptive text being provided. As an example, portal managers may initially import third-party ad offers directly into the system by utilizing spreadsheets provided by the third-party offer provider. The metadata provided by the third party offer provider may include campaign name, ad product name, search keywords, an ad headline, a short description of the ad, and/or an ad display uniform resource locator ("URL"). The provided text metadata is then analyzed. Optionally, the ad's full webpage may be analyzed. A fuzzy-matching component and a natural language and statistical text mining component may be utilized for the analysis. The natural language and statistical text mining component extracts and counts keywords and key phrases, identifies named entities, e.g., proper noun terms, and classifies the product to determine the product category, product attributes from its description, pricing data, and other relevant information. After the ad metadata is analyzed, all extracted ad fuzzy-matched data and metadata is stored, indexed, and normalized to terms into the offer inventory database. User data attributes, e.g., product interests or wishlist product names, are then utilized to search the product and category ontology to find fuzzy and normalized terms that will be utilized to locate specific product offers in the offer inventory database 106. In one configuration, a fuzzy-matching approach is utilized. User data such as brand information, wishlist products, and/or prior transaction data are combined to form a query to search the offer inventory database 106. Matches are based on similar terms or similar collections of keywords. In another configuration, a semantics-based/ontology approach is utilized. User data such as brand information, wishlist products, prior transaction data are analyzed and structured into a query using natural language processing ("NLP") and a term ontology to directly search the product names and product categories in the offer ontology. The semantics-based approach may augment the fuzzy-matching approach since product terminology utilized by users and marketers may not match up properly even when fuzzy-matching is utilized. Offers matched by the offer database search are delivered to the consumer for review, discard, or conversion. Views and conversions are recorded, and the portal receives revenue credit from the offer provider/partner.

Figure 4:
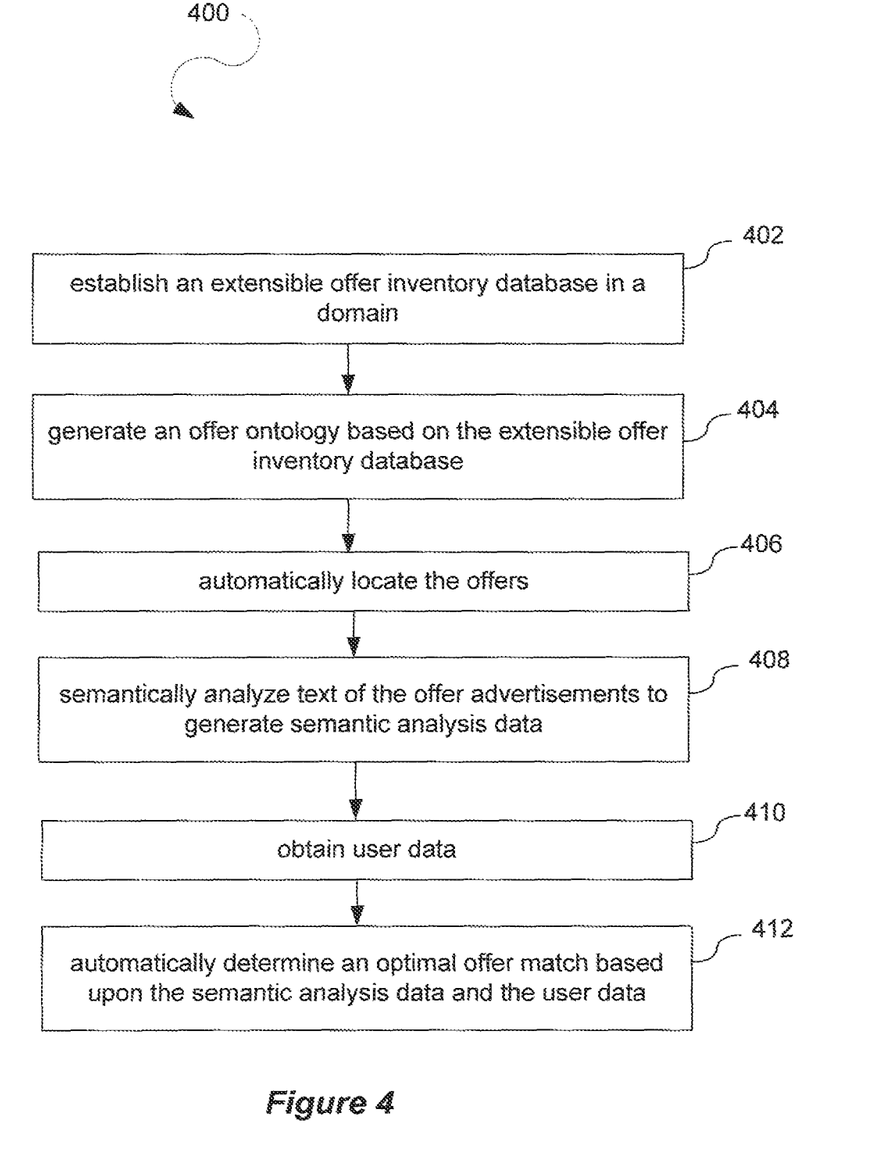
FIG. 4 illustrates a process that may be utilized to provide offer inventory expansion.

FIG. 4 illustrates a process 400 that may be utilized to provide offer inventory expansion. At a process block 402, the process 400 establishes an extensible offer inventory database of offers in a domain. Further, at a process block 404 the process 400 generates an offer ontology based on the extensible offer inventory database. The offer ontology provides an extensible vocabulary that correlates to categories in the offer inventory database. In addition, at a process block 406, the process 400 automatically locates offers. At a process block 408, the process 400 semantically analyzes the offers to generate semantic analysis data. Further, at a process block 410, the process 400 obtains user data. In addition, at a process block 412, the process 400 automatically determines an optimal offer match based upon semantic analysis data and the user data.

Figure 5:
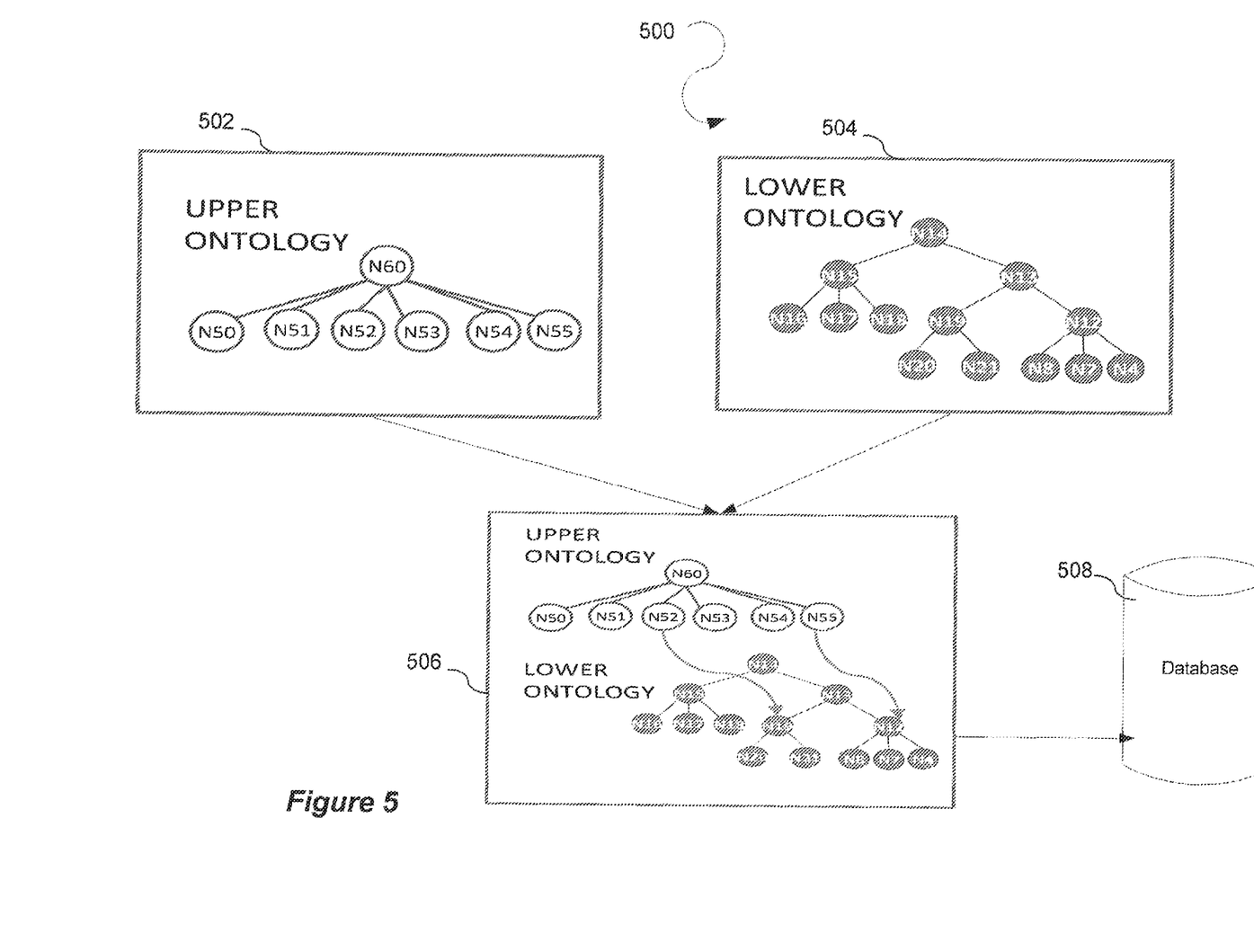
FIG. 5 illustrates an offer ontology establishment configuration.

FIG. 5 illustrates an offer ontology establishment configuration 500. An upper generic ontology 502 for product categories, products, and interrelationships is generated or obtained. Further, a lower category ontology 504 for detailed product, categories, terms, and/or synonyms is generated. A lower category ontology 504 may be generated for each major subcategory, e.g., consumer electronics. The lower category ontology 504 may be generated utilizing manual curation and/or automatic ontology generation from processing annotated catalog product pages as machine learning examples. The upper generic ontology 502 is combined with the lower category ontology 504 into a combined ontology 506. The combined ontology 506 is then deployed as a product and category ontology and may be stored in a database 508.

In an example configuration, nodes from the lower category ontology 504 that are added consist only of leaf nodes that represent new product offer categories that do not exist in the original upper generic ontology 502. These new product category nodes are attached to category stub nodes provided by the upper generic ontology 502. In another example configuration, entire product sub-ontologies may already exist and will be incorporated into the existing upper generic ontology 502. For example, product offers in the category of mp3 players may be found in a portal's product ontology, but may be completely missing from the initial master upper ontology. Accordingly, the category of mp3 players is manually identified as a general product category. The lower category ontology 504 is then linked to the top-level interest categories in the upper generic ontology 502. After the master ontology has been updated, the new combined ontology is deployed to the product portal system and utilized to map and match user interest attribute data to product category and product name terms. These normalized terms can then be utilized to directly search the offer inventory database.

The process of integrating or aligning external ontologies into the master ontology is accomplished by linking the external lower category ontologies to the upper generic ontology 502 at appropriate upper ontology category nodes. These linkage points are identified by using either a manual alignment process or by an automatic category matching algorithm, e.g., by iteratively identifying and aligning the most similar leaf node labels of each ontology or by using a combination or sub-combination of Jaccard index, Tanomoto coefficient, and Levenshtein distance methodologies.

The Jaccard index, where A and B represent the bag of words model for each ontology node label Category-A and Category-B being aligned is described as follows:

$$J_\delta(A, B) = 1 - J(A, B) = \frac{|A \cup B| - |A \cap B|}{|A \cup B|}.$$

Further, the Tanomoto coefficient, where A and B are the TF-IDF vectors of the descriptions of each Category-A and Category-B, respectively, being aligned is described as follows:

$$T(A, B) = \frac{A \cdot B}{\|A\|^2 + \|B\|^2 - A \cdot B} \text{ and } \cos(\theta) = \frac{A \cdot B}{\|A\|\|B\|}.$$

In addition, the Levenshtein distance, where term word characters and the term words are used to compute the minimum edit steps between all pairs to find the highest likelihood alignments, is described as follows:

```
int LevenshteinDistance(char s[1..m], char t[1..n])
{
    // for all i and j, d[i,j] will hold the Levenshtein distance between
    // the first i characters of s and the first j characters of t;
    // note that d has (m+1)x(n+1) values
    declare int d[0..m, 0..n]
    for i from 0 to m
        d[i, 0] := i // the distance of any first string to an empty second
        string
    for j from 0 to n
        d[0, j] := j // the distance of any second string to an empty first
        string
    for j from 1 to n
    {
```

```
        for i from 1 to m
        {
            if s[i] = t[j] then
                d[i, j] := d[i−1, j−1]      // no operation required
            else
                d[i, j] := minimum
                (
                    d[i−1, j] + 1,          // a deletion
                    d[i, j−1] + 1,          // an insertion
                    d(i−1, j−1] + 1         // a substitution
                )
        }
    }
    return d[m,n]
```

Figure 6:
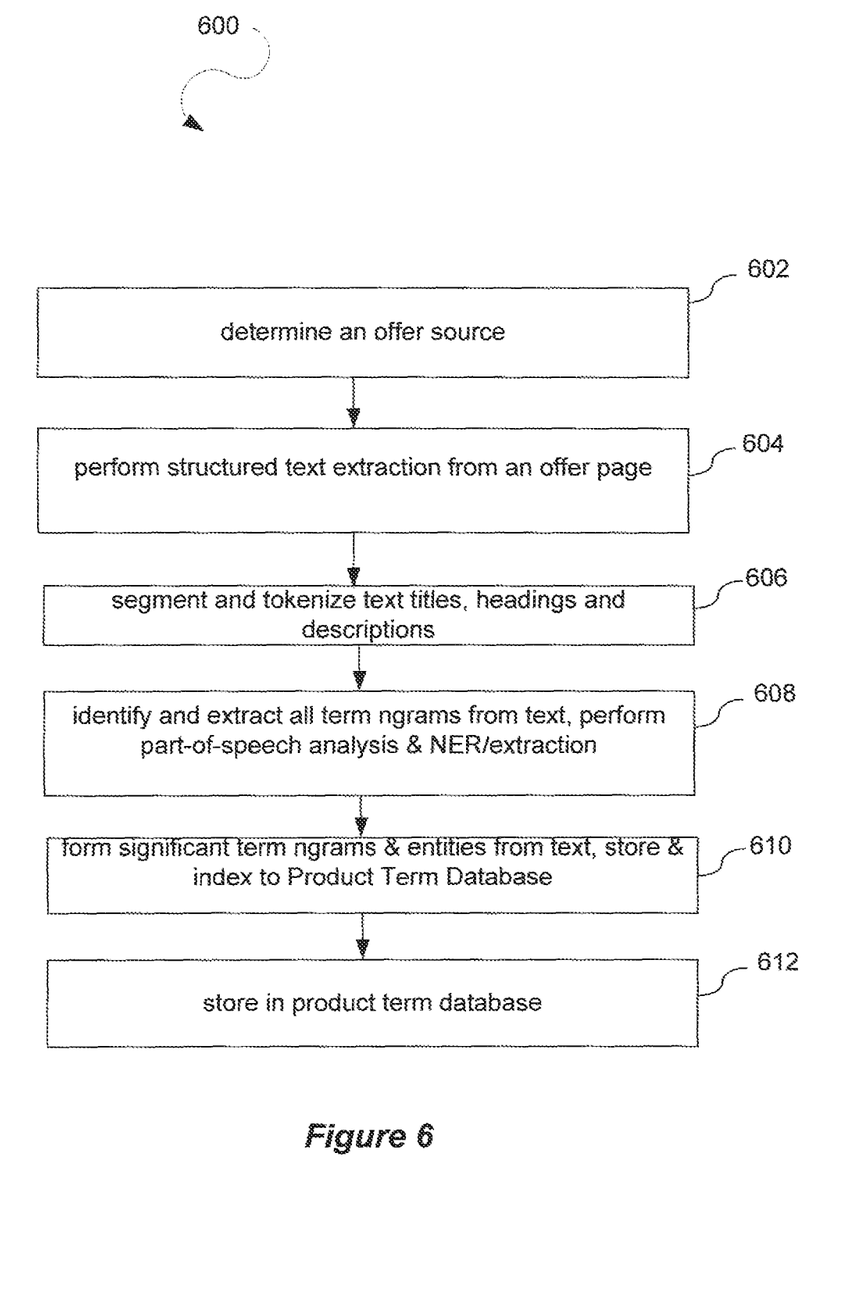
FIG. 6 illustrates a process that is utilized to locate and capture offers.

FIG. 6 illustrates a process 600 that is utilized to locate and capture offers. The process 600 automatically locates, captures, semantically analyzes, and extracts product offer ads and the essential related offer information. After being captured, these offers are then added to the offer inventory database and indexed by the offer ontology. At a process block 602, the process determines an offer source. Examples of the offer source may be the example configuration 100 of the offer inventory expansion system crawling a plurality of websites for online offers as illustrated in FIG. 1, the example configuration 200 in which the offer inventory expansion system is utilized to index offers from existing catalogs of retail clients as illustrated in FIG. 2, and the example configuration 300 in which the offer inventory expansion system is utilized to index partner offers. The offer source may be an external offer source that is utilized to increase the offer inventory of the website. Further, at a process block 604, the process 600 performs structured text extraction from an offer page of a website. In addition, at a process block 606, the process 600 segments and tokenizes text titles, headings and descriptions. Tokenization is a process of breaking a stream of text into words, phrases, symbols, or other meaningful elements called tokens, which become inputs for further processing such as parsing or text mining. In one embodiment, product offers and metadata are captured directly from the external website ontology utilizing published APIs. The captured offers and their associated metadata are stored into the offer inventory database and indexed for fast retrieval. This approach minimizes the ontology development by leveraging the taxonomy provided by the offer website, but is more restrictive as the offer website's inventory is a constraint and a website's offer taxonomy may be limited.

Figure 7:
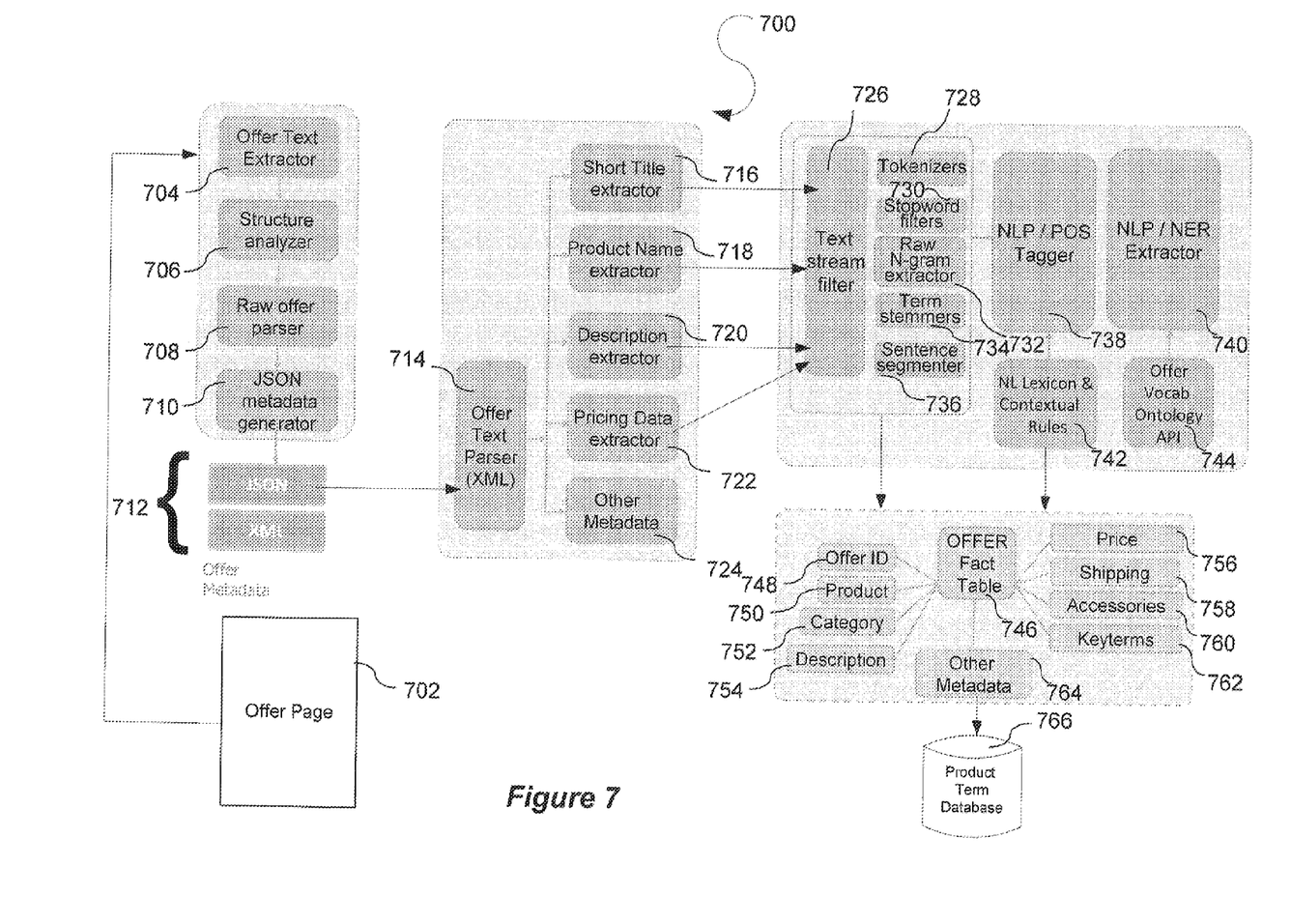
FIG. 7 illustrates an offer extraction, NLP Analysis, and Tagging configuration.

FIG. 7 illustrates an offer extraction, NLP Analysis, and Tagging configuration 700. An offer page 702 is provided to an offer text extractor 704 so that the offer text extractor 704 may extract text from the offer page 702. Various tools such as a structure analyzer 706 and a raw offer parser 708 may be utilized to perform the analysis. Further, the parsed text may be provided to a metadata generator such as a JSON metadata generator 710 to generate offer metadata 712. The offer metadata 712 may be in various formats such as JSON or XML. The offer metadata 712 may then be provided to an offer text parser 714. The offer text parser 714 may parse the offer metadata by utilizing a variety of sub-components such as a short title extractor 716 to extract the short title, a product name extractor 718 to extract the product name, a description extractor 720 to extract the description, a pricing data extractor 722 to extract the pricing data, and a metadata component 724 that extracts any other metadata. The subcomponents besides the other metadata component 724 may provide the extracted plaintext data to a text stream filter 726. The text stream filter 726 segments and tokenizes the text titles, headings, and descriptions into groups of sentences with tokenizers 728, stopword filters 730, term stemmers 734, and a sentence segmenter 736. Any pre-tagged metadata provided by the offer is also extracted. From each grouping of sentences, a Raw N-gram extractor 732 identifies and extracts all raw term N-grams from the text. An NLP/part-of-speech ("POS") Tagger 738 is utilized to perform a POS analysis and an NLP/named entity recognition ("NER") extractor 740 is utilized to find regular and proper noun phrases for each term N-gram. An N-gram is a subsequence of n items form a given sequence. Further, an N-gram model is a type of probabilistic model for predicting the next item in an N-gram sequence. The NER extractor may be a subtask of information extraction that seeks to locate and classify atomic elements in text into predefined categories such as the names of persons, organizations, locations, expressions of times, quantities, monetary values, percentages, etc. The NLP/POS Tagger 732 utilize Natural Language ("NL") Lexicon and Contextual Rules 742. Further, the NLP/NER Extractor 740 utilizes an offer vocabulary ontology API 744. Semantic term N-grams and entities are formed for each extracted noun phrase and then stored an indexed as both N-gram entities and as hierarchically classified NER entities into a product term database 766. Offer metadata from the structured extraction, top offer word N-grams, and hierarchically classified named entities, e.g., regular and proper noun terms, are utilized to determine the offer category, e.g., consumer electronics→digital cameras, the product brand, the product attributes, e.g., number of megapixels, and/or possible accessories, e.g., flash memory, carrying case, cleaning kit, etc. Offer metadata and extracted attributes are utilized to index each offer for later retrievals from the offer inventory database when users are matched with offers.

Matching user data, e.g., interest preferences, wishlist data, etc., to offers in the inventory may be performed with fuzzy-matching and/or semantic-matching. The fuzzy-matching approach performs matching by finding terms or phrases that are lexically similar to the user data. As an example, a bag-of-words model, word stemming, and the Jaccard similarity coefficient may be utilized to find the closest matches. The semantic-matching approach performs matching by utilizing semantic analysis of product text and consumer data to determine normalized product names from synonym relationships in the ontology, product categories using hypernym relationships, e.g., more generic relationships, within the ontology, and associated terms to determine offer accessories.

Figure 8:
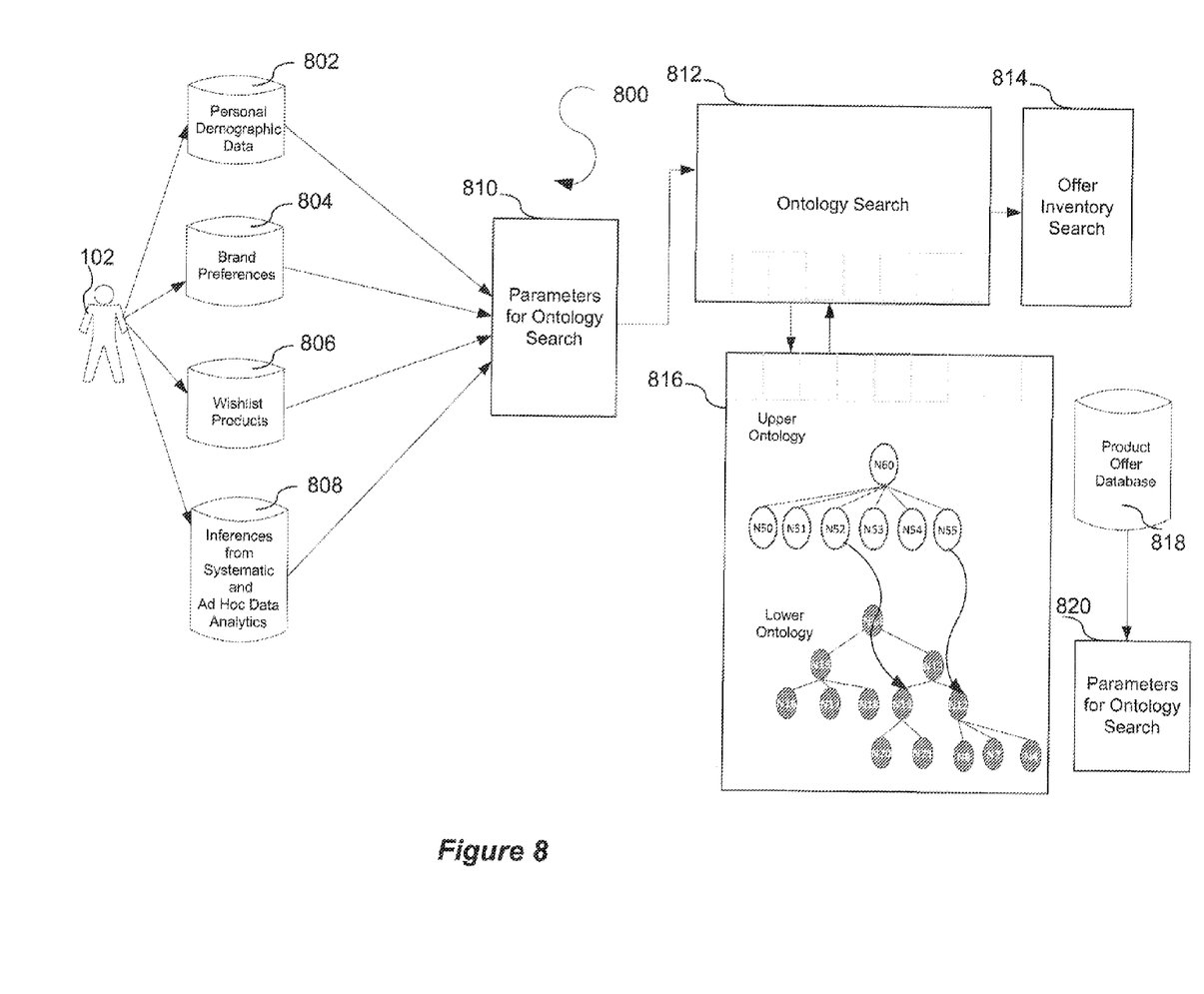
FIG. 8 illustrates a matching configuration.

FIG. 8 illustrates a matching configuration 800. The offer inventory expansion system automatically utilizes information gathered about the user combined with both fuzzy-matching and the semantic analysis of offer information to find the most relevant and optimal matching offers from its offer inventory.

The offer inventory expansion system utilizes personal demographic data 802, which includes certain user contact data, e.g., zipcode, city, state, and user demographic data, e.g., age, gender, income, etc. Further, the offer inventory expansion system provides offer brand preferences 804, which includes brands the user has an affinity towards, either by explicit preference indication, or inferred by extraction from transaction purchase history. In addition, the offer inventory expansion system also provides wishlist products 806 such as product names, their brands, and descriptive information that indicate the user's purchase intent or interest. The offer inventory expansion system also utilizes inferences from systematic and ad hoc data analytics 808, which employ large-scale data mining and analytics to infer other user attributes that are utilized in the matching phase. The offer inventory expansion system selects and filters user preference and interest data from the input data sources and transform this data into search strings suitable for use as parameters 810 for query(s) that will be utilized for a product terminology ontology search. The offer inventory expansion system then performs an ontology search 812. The ontology search 812 is performed by issuing query(s) to a product term ontology 816 to map preference and interest data to form product index search terms. Utilizing the generated product index search terms, the offer inventory expansion system performs an offer inventory search 814 to by executing the offer inventory search queries utilizing the product index search terms against the offer product database 818. The offer inventory expansion system computes matching scores, ranks offers, and then returns offers from the offer product database to an offer delivery system 820. The offer inventory expansion system then tracks user views and user conversions for the offers.

Figure 9:
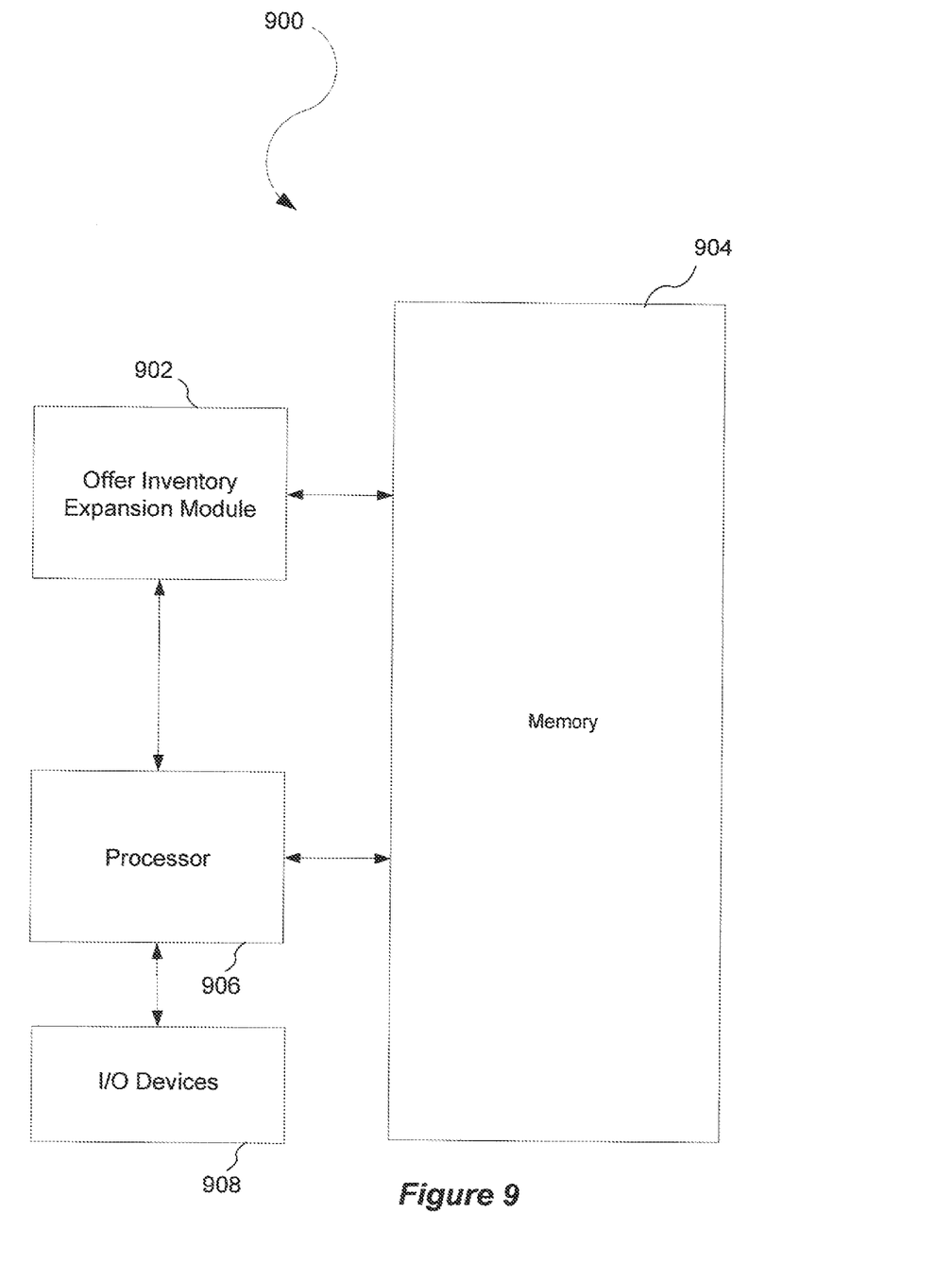
FIG. 9 illustrates a system configuration that may be utilized for micro-segment automatic classification.

FIG. 9 illustrates a system configuration 900 that may be utilized for micro-segment automatic classification. In one embodiment, an offer inventory expansion module 902 interacts with a memory 904. In one embodiment, the system configuration 900 is suitable for storing and/or executing program code and is implemented using a general purpose computer or any other hardware equivalents. The processor 906 is coupled, either directly or indirectly, to the memory 904 through a system bus. The memory 904 can include local memory employed during actual execution of the program code, bulk storage, and/or cache memories which provide temporary storage of at least some program code in order to reduce the number of times code must be retrieved from bulk storage during execution.

The Input/Output ("I/O") devices 908 can be coupled directly to the system configuration 900 or through intervening input/output controllers. Further, the I/O devices 908 may include a keyboard, a keypad, a mouse, a microphone for capturing speech commands, a pointing device, and other user input devices that will be recognized by one of ordinary skill in the art. Further, the I/O devices 908 may include output devices such as a printer, display screen, or the like. Further, the I/O devices 908 may include a receiver, transmitter, speaker, display, image capture sensor, biometric sensor, etc. In addition, the I/O devices 908 may include storage devices such as a tape drive, floppy drive, hard disk drive, compact disk ("CD") drive, etc. Any of the modules described herein may be single monolithic modules or modules with functionality distributed in a cloud computing infrastructure utilizing parallel and/or pipeline processing.

Network adapters may also be coupled to the system configuration 900 to enable the system configuration 900 to become coupled to other systems, remote printers, or storage devices through intervening private or public networks. Modems, cable modems, and Ethernet cards are just a few of the currently available types of network adapters.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above.

It should be understood that the processes and systems described herein can take the form of entirely hardware embodiments, entirely software embodiments, or embodiments containing both hardware and software elements. If software is utilized to implement the method or system, the software can include but is not limited to firmware, resident software, microcode, etc.

It is understood that the processes and systems described herein may also be applied in other types of processes and systems. Those skilled in the art will appreciate that the various adaptations and modifications of the embodiments of the processes and systems described herein may be configured without departing from the scope and spirit of the present processes, systems, and computer program products. Therefore, it is to be understood that, within the scope of the appended claims, the present processes, systems, and computer program products may be practiced other than as specifically described herein.

We claim:

1. A hardware computer storage medium comprising a computer readable program stored thereon that, responsive to execution on a computer, causes the computer to perform operations comprising:
   establishing an extensible offer inventory database in a domain;
   generating an offer ontology based on the extensible offer inventory database, the offer ontology providing an extensible vocabulary that correlates offers to categories in the offer inventory database;
   automatically locating the offers;
   semantically analyzing text of the offers to generate semantic analysis data;
   obtaining user data of a user from a user data source, the user data comprising at least one of personal demographic data of the user, brand preferences of the user, wishlist products of the user, or a purchase history of the user;
   automatically determining offers for the user based upon the semantic analysis data and the user data, the automatically determining offers comprising:
      transforming the user data into search strings to be used as parameters in queries for a product terminology ontology search;
      performing the product terminology ontology search by issuing the queries to a product term ontology to form product index search terms; and
      performing an offer inventory search of the offer inventory database using the product index search terms to determine the offers for the user;
   providing the offers to the user; and
   recording whether the user views, discards, or views and accepts the offers.

2. The hardware computer storage medium of claim 1, wherein the computer readable program responsive to execution by the computer causes the computer to perform operations further comprising performing a web crawl of a plurality of websites to find an offer for the extensible offer inventory database.

3. The hardware computer storage medium of claim 1, wherein the computer readable program responsive to execution by the computer causes the computer to perform operations further comprising indexing offers from a plurality of e-catalogs.

4. The hardware computer storage medium of claim 1, wherein the computer readable program responsive to execution by the computer causes the computer to perform operations further comprising indexing a partner offer.

5. The hardware computer storage medium of claim 1, wherein the computer readable program responsive to execution by the computer causes the computer to perform operations further comprising directly importing a search engine offer from a third-party website.

6. The hardware computer storage medium of claim 1, wherein the offers include at least one offer for a product.

7. The hardware computer storage medium of claim 1, wherein the offers include at least one offer for a service.

8. The hardware computer storage medium of claim 1, wherein the offers include at least one offer for content.

9. A method comprising:
establishing an extensible offer inventory database in a domain;
generating an offer ontology based on the extensible offer inventory database, the offer ontology providing an extensible vocabulary that correlates offers to categories in the offer inventory database;
automatically locating the offers;
semantically analyzing text of the offers to generate semantic analysis data;
obtaining user data of a user from a user data source, the user data comprising at least one of personal demographic data of the user, brand preferences of the user, wishlist products of the user, or a purchase history of the user;
automatically determining offers based upon the semantic analysis data and the user data, the automatically determining offers comprising:
transforming the user data into search strings to be used as parameters in queries for a product terminology ontology search;
performing the product terminology ontology search by issuing the queries to a product term ontology to form product index search terms; and
performing an offer inventory search of the offer inventory database using the product index search terms to determine the offers for the user;
providing the offers to the user; and
recording whether the user views, discards, or views and accepts the offers.

10. The method of claim 9, further comprising performing a web crawl of a plurality of websites to find an offer for the extensible offer inventory database.

11. The method of claim 9, further comprising indexing offers from a plurality of e-catalogs.

12. The method of claim 9, further comprising indexing a partner offer.

13. The method of claim 9, further comprising directly importing a search engine offer from a third-party website.

14. The method of claim 9, wherein the offers include at least one offer for a product.

15. The method of claim 9, wherein the offers include at least one offer for a service.

16. The method of claim 9, wherein the offers include at least one offer for content.

17. A system comprising:
an extensible offer inventory database in a domain;
an offer ontology engine that generates an offer ontology based on the extensible offer inventory database, the offer ontology providing an extensible vocabulary that correlates to categories in the offer inventory database;
an advertisement location module that automatically locates the offers;
a semantic analysis module that semantically analyzes text of the offers to generate semantic analysis data;
a reception module that receives user data of a user from a user data source, the user data comprising at least one of personal demographic data of the user, brand preferences of the user, wishlist products of the user, or a purchase history of the user;
a processor that automatically:
determines offers for the user based upon the semantic analysis data and the user data by:
transforming the user data into search strings to be used as parameters in queries for a product terminology ontology search;
performing the product terminology ontology search by issuing the queries to a product term ontology to form product index search terms; and
performing an offer inventory search of the offer inventory database using the product index search terms to determine the offers for the user;
provides the offers to the user; and
initiates recording of whether the user views, discards, or views and accepts the offers.

18. The system of claim 17, wherein the offers include at least one offer for a product.

19. The system of claim 17, wherein the offers include at least one offer for a service.

20. The system of claim 17, wherein the offers include at least one offer for content.

* * * * *